United States Patent [19]

Bass

[11] Patent Number: 4,645,041

[45] Date of Patent: Feb. 24, 1987

[54] BRAKE DISCS

[75] Inventor: Richard A. Bass, Hampton Magna, United Kingdom

[73] Assignee: Automotive Products plc, Leamington Spa, England

[21] Appl. No.: 722,063

[22] Filed: Apr. 11, 1985

[30] Foreign Application Priority Data

Apr. 24, 1984 [GB] United Kingdom ................ 8410423

[51] Int. Cl.⁴ ............................................. F16D 65/12
[52] U.S. Cl. ........................... 188/218 XL; 192/107 R
[58] Field of Search .............. 188/218 XL; 192/70.16, 192/107 R; 403/356

[56] References Cited

U.S. PATENT DOCUMENTS

| 3,526,307 | 9/1970 | Falzone | 188/218 XL X |
| 3,530,960 | 9/1970 | Otto et al. | 188/218 XL |
| 3,542,166 | 11/1970 | Harrison | 188/218 XL |
| 4,286,694 | 9/1981 | Wiseman, Jr. et al. | 188/264 AA X |

FOREIGN PATENT DOCUMENTS

| 62774 | 10/1982 | European Pat. Off. | 188/218 XL |
| 85361 | 8/1983 | European Pat. Off. | |
| 1380135 | 10/1964 | France | 188/218 XL |
| 752101 | 7/1956 | United Kingdom | 188/218 XL |
| 983548 | 2/1965 | United Kingdom | |
| 1148210 | 4/1969 | United Kingdom | |
| 1259135 | 1/1972 | United Kingdom | |
| 1412758 | 11/1975 | United Kingdom | |
| 1490249 | 10/1977 | United Kingdom | |
| 1499898 | 2/1978 | United Kingdom | |
| 1528254 | 10/1978 | United Kingdom | |
| 1580303 | 12/1980 | United Kingdom | |

Primary Examiner—George E. A. Halvosa
Attorney, Agent, or Firm—Solon B. Kemon

[57] ABSTRACT

A brake disc comprises an inner mounting member and outer annular braking member and a driving connection between the two members. The braking member has the usual flat annular braking surfaces. The driving connection comprises a square shaped drive dog which engages in corresponding notches in the outer periphery of the mounting member and the inner periphery of the braking member. The notches have flat driving faces in engagement with corresponding flat faces on the drive dog. Axial location is by stop flanges secured together through an aperture in the drive dog. The axial length of the dog is greater than the thickness of the disc members so the flanges, in engagement with the axial end faces, allow some axial movement. A crinkle washer controls the relative axial positions. There are a plurality of drive dogs spaced equally around the disc.

5 Claims, 4 Drawing Figures

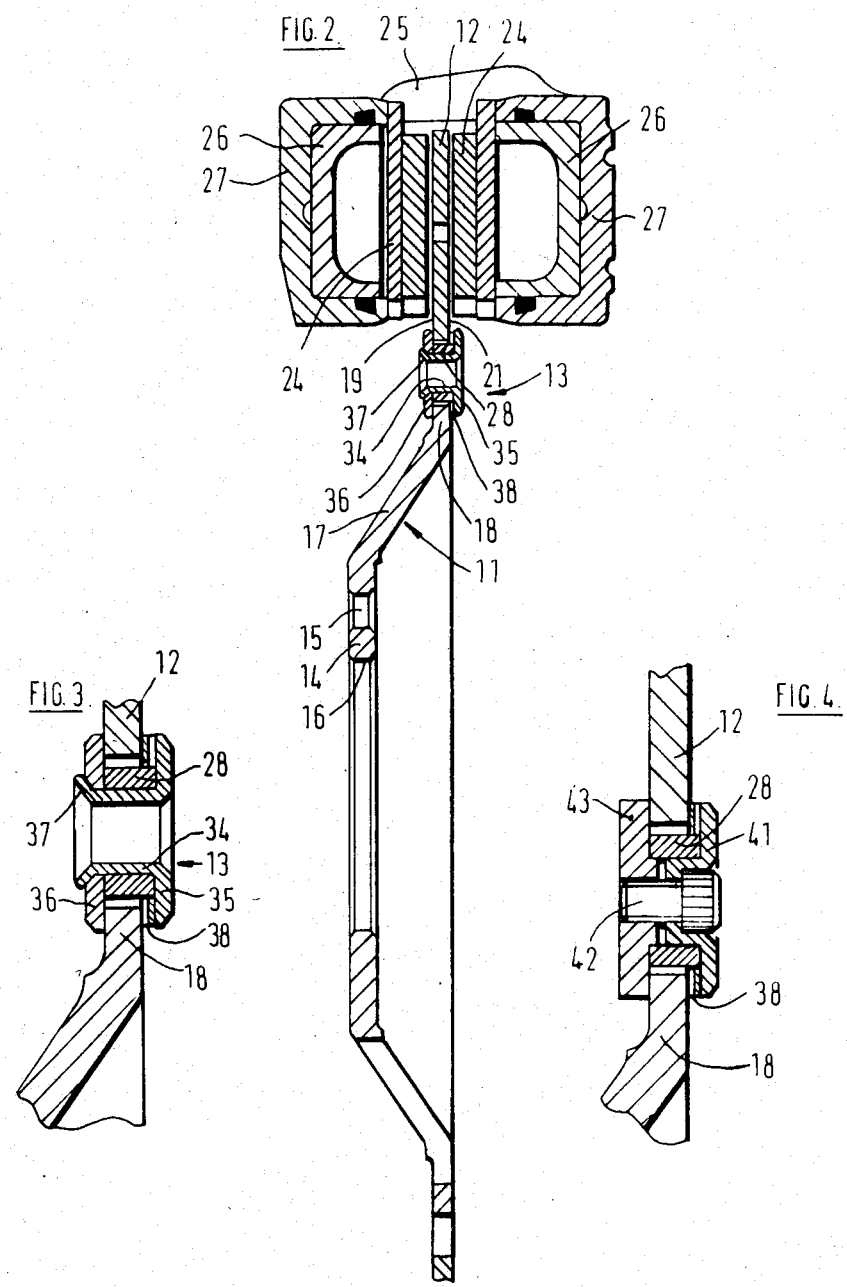

BRAKE DISCS

BACKGROUND OF THE INVENTION

The invention relates to brake discs for disc brakes.

One known type of brake disc, particularly for use on high performance motor cycles comprises an inner mounting member by which the disc is mounted for rotation with a road wheel and an outer annular braking member. A driving connection between the inner and outer members comprises aligned part-cylindrical notches in the outer periphery of the mounting member and the inner periphery of the braking member with a cylindrical drive dog engaged in each pair of aligned notches. The arrangement is such as to allow limited axial float of the braking member on the mounting member, primarily to allow the braking member to align itself with a brake caliper despite possible irregularities in the mounting of the mounting member. Such a driving connection also allows the braking member to expand radially outward and tends to result in very little heat transfer to the mounting member. It is also known from British Patent Specification No. 983548 to provide inner and outer disc members with rectangular notches and to employ cylindrical drive dogs using their flat end faces as driving faces.

An object of the present invention is to provide an improved form of driving connection between the inner and outer members of a brake disc.

SUMMARY OF THE INVENTION

In accordance with the present invention there is provided a brake disc comprising an inner mounting member; an annular braking member; a driving connection between the members comprising aligned notches in the outer and inner peripheries respectively of the two members having flat substantially radial drive faces and a drive dog engaged in each pair of aligned notches having corresponding flat substantially radial drive faces co-operating with the drive faces of the notches and an aperture therethrough extending parallel to the disc axis, the driving connection allowing some relative movement between the members including radial thermal expansion of the braking member; and axial constraining means comprising two stop flanges one to each axial end of each dog secured together and in abutment with their respective axial end of the dog by fastening means passing through the aperture, the flanges extending beyond the dog and co-operating with both members to provide axial constraint therebetween. As a result of the substantially flat driving faces, radial thermal expansion does not introduce significant circumferential clearance at the driving connection with the result that the disc is still held substantially concentric with the mounting member. Also, the critical axial dimension in providing controlled axial constraint between the members is the axial length of the dog, obviating any requirement for a high degree of accurancy in the stop flanges and their fastening.

Preferably the drive dogs and notches are substantially rectangular. The drive dogs may extend out beyond both axial ends of the notches whereby the flanges allow limited relative axial movement between the members.

A resilient element may be disposed between one stop flange and the adjacent faces of the two members to bias the members into contact with the other flange.

The fastening means may comprise a screw threaded interconnection or a rivetted interconnection between the flanges.

The braking member may be provided with inclined slots arranged so that the inner edge of the slot leads the outer edge in the normal direction of rotation of the disc.

BRIEF DESCRIPTION OF THE DRAWINGS

Embodiments of the invention will now be described by way of example only with reference to the accompanying drawings in which:

FIG. 2 is a section on line II—II of FIG. 1, also showing some basic parts of a brake caliper;

FIG. 3 is an enlarged view, corresponding to part of FIG. 2, of the connection between the members; and FIG. 4 corresponds to FIG. 3 but shows a modification.

DESCRIPTION OF A PREFERRED EMBODIMENT

Figure 1:
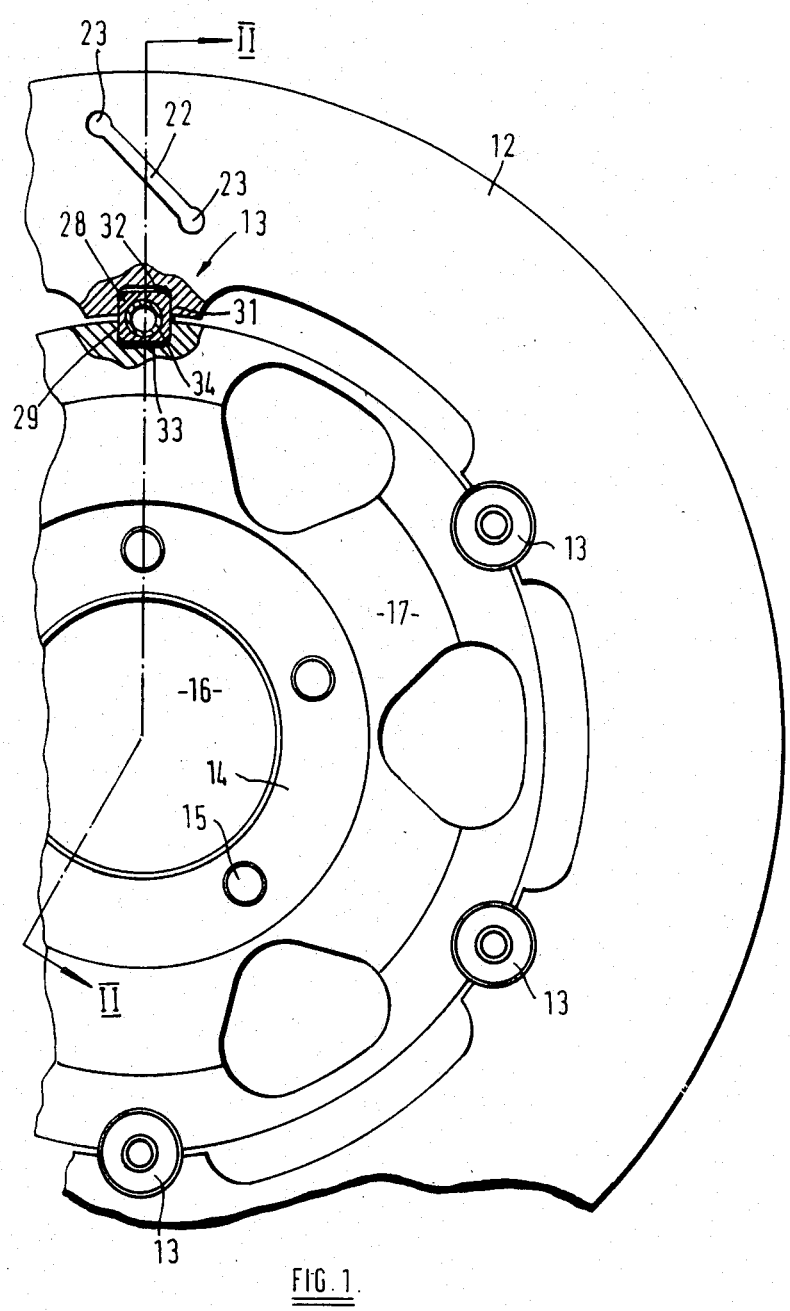
FIG. 1 is an axial view of major parts of a brake disc, showing one driving dog in section.

The brake disc shown in FIGS. 1 and 2 comprises an inner mounting member 11, an outer annular braking member 12 and a driving connection 13 between these members The mounting member 11 has a flat inner flange 14 with five mounting holes 15 and a central opening 16 to allow the mounting member 11 to be secured to a hub of a wheel which is to be braked. In use, mounting bolts or studs are applied through the holes 15 and either these holes or the central opening 16 centralise the mounting member on its hub. A frusto-conical portion 17 interconnects the flat inner flange 14 with a flat outer flange 18. The driving connection 13 engages with this outer flange 18.

The braking member 12 is a flat annular member with parallel braking surfaces 19 and 21, one to each side. A series of inclined slots 22, only one of which is shown but which are spaced out at regular intervals around the disc, are provided. Each slot terminates at both ends in an enlarged circular portion 23 which restricts stress concentrations at the ends of the slots and thus tends to prevent cracking of the disc. In use, when the disc is rotating, the slots 22 tend to encourage air flow round the disc and thereby assist in keeping it cool. The slots are inclined in such a way that the leading edge, in the normal direction of rotation, is inward from the trailing edge. Due to this inclination, air tends to be thrown in an outward direction during rotation.

FIG. 2 also shows some basic features of a brake caliper for use with the disc. Friction pads 24 are mounted in a caliper body 25 which also carries two hydraulic pistons 26 in cylinders 27. When the interiors of cylinders 27 are pressurised the pistons 26 move pads 24 into firm engagement with the disc braking member 12 and thus apply a frictional force to the disc, tending to slow or stop its rotation.

The driving connection shown in FIGS. 1 to 3 between the mounting member 11 and the braking member 12 comprises six drive dogs 28 spaced out at regular intervals around the disc. Each dog 28 is generally rectangular so that it has two substantially radial drive faces 29 and 31. Each dog 28 is engaged in a substantially rectangular notch 32 in the braking member 12 and in a corresponding aligned rectangular notch 33 in the mounting member 11. Although notches 32 and 33 are generally rectangular, they do have rounded corners as shown in the interests of manufacturing convenience and to avoid stress concentrations. Similarly, dog 28 has chamfered corners to provide clearance from the corners in the notches.

As best seen in FIG. 3, each dog 28 has a central circular aperture through which a hollow rivet 34 passes. The rivet has a head 35 which provides a stop flange at one axial end of the drive dog. The other end of the rivet passes through a washer 36 which acts as a stop flange at the opposite radial end of the dog and the rivet is splayed out at 37 so that it acts as a fastening means to secure the flanges together and in contact with the axial ends of the dog. The length of the dog 28 itself is greater than the thickness of the mounting member flange 18 and the thickness of the braking member 12 so that it extends beyond the ends of the notches and some axial free play is provided between the braking member and dog and between the dog and mounting member, thus similarly providing axial free play between the braking member and mounting member.

In order to reduce any tendency for rattle at the driving connection, and to bias the disc members into accurate alignment with each other, a resilient element constituted by a crinkle spring washer 38 is provided as shown between flange 35 and the braking and mounting members. These members are thus biassed into contact with the other flange 36.

As shown in FIG. 1, each dog is a close (but free sliding) fit within its associated notches in a circumferential direction. Thus the dogs provide positive circumferential relative location and accurate co-axial location between the members. The outer and inner faces of each dog have a clearance with respect to the combined radial dimension of two aligned notches because these inner and outer faces are not intended to be used for location purposes.

The lateral edges of the notches and the corresponding drive faces 29 and 31 of each dog 28 are of course substantially radial and they provide flat driving faces with a large contact area for the driving connection.

Following a severe or several repeated brake applications, the temperature of the braking member 12 rises significantly resulting in thermal expansion. This thermal expansion increases the inner and outer diameters of the braking member and causes it to move axially outward with respect to the driving connection. However, the circumferential length of the notches increases only very slightly with the result that accurate location between the mounting and braking members is maintained and no substantial circumferential free play develops.

In the modification shown in FIG. 4, the fastening means comprises a screw threaded interconnection instead of a rivetted interconnection between the flanges. In particular, one flange 41 incorporates a boss by means of which it can be located in the aperture in the dog 28. A bolt 42, recessed in the flange 41 passes through the aperture and engages in a screw thread in a central boss of a second stop flange 43. The two bosses together have a length less than that of the dog so that tightening of the threaded connection holds both flanges in abutment with the end faces of the dog 28. Locking means such as an adhesive and/or a staking operation are employed to prevent inadvertent release of the screw thread. In other respects the inter-connection illustrated by FIG. 4 corresponds to that of FIGS. 1 to 3.

I claim:

1. A brake disc comprising an inner mounting member; an outer annular braking member having radially aligned, axially outer planar surfaces; a driving connection between the members comprising flat substantially radial drive faces defining aligned substantially rectangular notches in the outer and inner peripheries respectively of the two members and a one piece substantially rectangular drive dog engaged in each pair of aligned notches having corresponding flat substantially radial drive faces co-operating with the drive faces of the notches, clearances in a radial direction between the dog in the notches and an aperture extending completely through the drive dog parallel to the disc axis, said clearances allowing some relative movement between the members including radial thermal expansion of the braking member and relative axial movement between the members; the drive dog having an axial length greater than the thickness in an axial direction of the mounting member in the region of the drive dogs and greater than the thickness in an axial direction of the braking member in the region of the drive dogs and axial constraining means operative between the mounting member and the braking member comprising two stop flanges one to each axial end of each dog in abutment with their respective axial end of the dog and fastening means passing through the aperture and engaged with the flange to secure them against the axial ends of the dog; the flanges extending beyond the dog and co-operating with both said members to provide axial constraint therebetween.

2. A brake disc according to claim 1 comprising a resilient element disposed between one stop flange and an adjacent face of the braking member and acting between said stop flange and an adjacent face of the mounting member to bias the members into contact with each other of said flanges.

3. A brake disc according to claim 1 wherein the fastening means comprises a screw threaded interconnection between the flanges 4. A brake disc according to claim 1 wherein the fastening means comprises a rivetted inter-connection between the flanges.

5. A brake disc according to claim 1 wherein the braking member is provided with inclined slots arranged so that the inner edge of each slot leads the outer edge in the normal direction of rotation of the disc.

* * * * *